(12) United States Patent
Isitman et al.

(10) Patent No.: US 10,336,889 B2
(45) Date of Patent: Jul. 2, 2019

(54) PNEUMATIC TIRE

(71) Applicant: The Goodyear Tire & Rubber Company, Akron, OH (US)

(72) Inventors: Nihat Ali Isitman, Ettelbruck (LU); Luisa Fernanda Munoz Mejia, Luxembourg (LU); Claude Charles Jacoby, Wasserbillig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 84 days.

(21) Appl. No.: 15/170,102

(22) Filed: Jun. 1, 2016

(65) Prior Publication Data

US 2017/0349733 A1    Dec. 7, 2017

(51) Int. Cl.
| | |
|---|---|
| *C08K 5/101* | (2006.01) |
| *B60C 1/00* | (2006.01) |
| *C08L 7/00* | (2006.01) |
| *C08L 9/00* | (2006.01) |
| *C08K 3/36* | (2006.01) |
| *C08K 5/10* | (2006.01) |
| *C08L 9/06* | (2006.01) |
| *C08L 21/00* | (2006.01) |

(52) U.S. Cl.
CPC ............. *C08L 7/00* (2013.01); *B60C 1/0016* (2013.01); *C08K 3/36* (2013.01); *C08K 5/10* (2013.01); *C08K 5/101* (2013.01); *C08L 9/00* (2013.01); *C08L 9/06* (2013.01); *C08L 21/00* (2013.01); *C08L 2205/02* (2013.01); *C08L 2205/03* (2013.01); *C08L 2205/06* (2013.01)

(58) Field of Classification Search
CPC .............................. C08K 5/101; B60C 1/0016
See application file for complete search history.

(56) References Cited

U.S. PATENT DOCUMENTS

| | | | |
|---|---|---|---|
| 4,567,928 A * | 2/1986 | Takiguchi | B60C 1/0016 152/209.1 |
| 4,616,685 A * | 10/1986 | Harakon | B60C 1/0016 152/209.1 |
| 5,717,022 A | 2/1998 | Beckmann | |
| 5,967,211 A * | 10/1999 | Lucas | B60C 1/0016 152/209.4 |
| 7,084,228 B2 | 8/2006 | Labauze | |
| 7,253,225 B2 | 8/2007 | Labauze | |
| 7,335,692 B2 | 2/2008 | Vasseur | |
| 7,431,061 B2 | 10/2008 | Mathieu | |
| 2003/0205309 A1 | 11/2003 | Sandstrom | |
| 2004/0127617 A1 | 7/2004 | Vasseur | |
| 2013/0281588 A1 | 10/2013 | Yamagishi | |
| 2013/0310483 A1 * | 11/2013 | Botti | B60C 1/0016 523/156 |
| 2013/0323449 A1 | 12/2013 | Bergmann | |
| 2014/0371346 A1 | 12/2014 | Saintigny | |
| 2015/0283854 A1 | 10/2015 | Saintigny | |
| 2015/0315358 A1 | 11/2015 | Yonemoto | |
| 2016/0009904 A1 | 1/2016 | Yamagishi | |
| 2017/0051134 A1 | 2/2017 | Yamagishi | |

FOREIGN PATENT DOCUMENTS

| | | |
|---|---|---|
| EP | 1761569 A2 | 3/2007 |
| EP | 2611858 A2 | 7/2013 |
| EP | 2937384 A1 | 10/2015 |
| JP | 06116443 A * | 4/1994 |
| WO | 2015166997 A1 | 11/2015 |

OTHER PUBLICATIONS

Machine translation of JP 06-116443 A, published Apr. 26, 1994.*
European Search Report dated Sep. 7, 2017 for Application Serial No. EP17171736.

* cited by examiner

*Primary Examiner* — Vickey Nerangis
(74) *Attorney, Agent, or Firm* — John D. DeLong

(57) ABSTRACT

The present invention is directed to a pneumatic tire having a tread comprising a vulcanizable rubber composition comprising, based on 100 parts by weight of elastomer (phr), 100 phr of a diene based elastomer having a glass transition temperature less than −50° C.; from 30 to 65 phr of a fatty acid monoester of formula 1

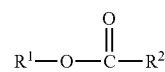

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl; less than 10 phr of a petroleum-derived oil; and from 50 to 130 phr of silica.

6 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Tires are sometimes desired with treads for promoting traction on snowy surfaces. Various rubber compositions may be proposed for tire treads. Here, the challenge is to reduce the cured stiffness of such tread rubber compositions, as indicated by having a lower storage modulus G' at −20° C., when the tread is intended to be used for low temperature winter conditions, particularly for vehicular snow driving.

It is considered that significant challenges are presented for providing such tire tread rubber compositions for maintaining both their wet traction while promoting low temperature (e.g. winter) performance.

SUMMARY OF THE INVENTION

The present invention is directed to a pneumatic tire having a tread comprising a vulcanizable rubber composition comprising, based on 100 parts by weight of elastomer (phr), 100 phr of a diene based elastomer having a glass transition temperature less than −50° C.; from 30 to 65 phr of a fatty acid monoester of formula 1

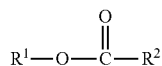

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl; less than 10 phr of a petroleum-derived oil; and from 50 to 130 phr of silica.

DESCRIPTION OF THE INVENTION

There is disclosed a pneumatic tire having a tread comprising a vulcanizable rubber composition comprising, based on 100 parts by weight of elastomer (phr), 100 phr of a diene based elastomer having a glass transition temperature less than −50° C.; from 30 to 65 phr of a fatty acid monoester of formula 1

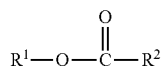

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl; less than 10 phr of a petroleum-derived oil; and from 50 to 130 phr of silica.

In one embodiment, the fatty acid monoester comprises at least one monoester selected from the group consisting of alkyl oleates, alkyl stearates, alkyl linoleates, and alkyl palmitates.

In one embodiment, the fatty acid monoester comprises at least 80 percent by weight of an alkyl oleate.

In one embodiment, the alkyl oleate is selected from the group consisting of methyl oleate, ethyl oleate, 2-ethylhexyl oleate, isopropyl oleate, and octyl oleate.

In one embodiment, the fatty acid monoester comprises at least 80 percent by weight of an oleate monoester.

In one embodiment, $R^1$ is C1 to C8 linear or branched alkyl.

In one embodiment, $R^1$ is selected from the group consisting of methyl, ethyl, 2-ethylhexyl, isopropyl, and octyl.

In one embodiment, the monoester of formula 1 is selected from the group consisting of monoesters of ethylene glycol, glycerol, trimethylolpropane, pentaerythritol, erythritol, xylitol, sorbitol, dulcitol, mannitol, and inositol.

In one embodiment, the rubber composition comprises from 40 to 55 phr of the fatty acid monoester of formula 1.

The rubber composition includes one or more rubbers or elastomers containing olefinic unsaturation and having a Tg less than −50 C. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Specific examples of synthetic rubbers include polybutadiene (including cis 1,4 polybutadiene), polyisoprene (including cis 1,4 polyisoprene), butyl rubber, styrene/isoprene/butadiene rubber, copolymers of 1,3 butadiene or isoprene with styrene. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent.

The solution polymerization prepared SBR (S-SBR) typically has a bound styrene content in a range of about 5 to about 50, preferably about 9 to about 26, percent. The S-SBR can be conveniently prepared, for example, by organo lithium catalyzation in the presence of an organic hydrocarbon solvent.

In one embodiment, cis-1,4 polybutadiene rubber (BR) may be used. Such BR can be prepared, for example, by organic solution polymerization of 1,3-butadiene. The BR may be conveniently characterized, for example, by having at least a 90 percent cis 1,4-content and a glass transition temperature Tg in a range of from about −95° C. to about −110° C.

In one embodiment, natural rubber or synthetic cis-1,4 polyisoprene may be used.

In one embodiment, the styrene-butadiene rubber may be functionalized with various functional groups, or the styrene-butadiene rubber may be non-functionalized. In one embodiment the styrene-butadiene rubber is functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group. In one embodiment, the styrene-butadiene rubber is not functionalized.

The diene based rubber has a glass transition temperature less than −50° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

The rubber composition may include up to 10 phr of a processing oil. In one embodiment, the amount of processing oil ranges from 1 to 5 phr. In one embodiment, the rubber composition is devoid of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

In one embodiment, the rubber composition includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

The vulcanizable rubber composition may include from about 50 to about 130 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

The vulcanizable rubber composition may optionally include from about 5 to about 50 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula 2:

Z-Alk-$S_n$-Alk-Z     2 in which Z is selected from the group consisting of

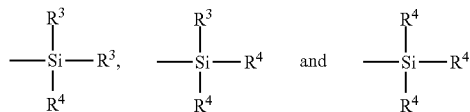

where $R^3$ is an alkyl group of 1 to 4 carbon atoms, cyclohexyl or phenyl; $R^4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula 2, preferably Z is

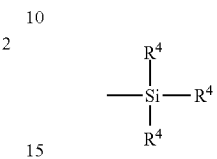

where $R^4$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Rubber compounds were mixed according to the formulations shown in Table 1, with amounts given in phr. The compounds were cured and tested for physical properties as shown in Table 2.

Samples C1 to C5 are made of blends of low Tg solution-SBR and cis-BR and a low Tg mineral oil with a varying SBR to BR polymer ratio. It is clear with increasing cis-BR content the stiffness at low temperature, E' at −40° C., decreases and tear resistance increases. The lowest stiffness at low temperature is attained with Sample C3 showing an E' (−40° C.) value of around 16 MPa and tear resistance around 15 N/mm With varying the ratio of low Tg synthetic rubbers SBR and BR, a low value of low temperature stiffness can be achieved, however, the tear resistance level is very low for a rubber compound for use as the tread component of studded tires to provide sufficient stud retention property. Samples C6 to C10 are made out of a blend of natural rubber and cis-BR and a low Tg mineral oil with a varying NR to BR ratio. When compared to for instance Sample 3, Samples C6 to C10 show a significantly higher tear resistance between 26 and 39 N/mm, however, a significantly higher stiffness at low temperatures are observed with E'(−40° C.) values between 49 to 53 MPa.

It is therefore observed from rubber formulations and physical properties shown in Tables 1 and 2 that a low stiffness value at low temperatures cannot be attained while maintaining a high tear resistance with the use of low Tg elastomers in combination with a low Tg mineral oil.

Example 2

Rubber compounds were mixed according to the formulations shown in Tables 3 and 5, with amounts given in phr. The compounds were cured and tested for physical properties as shown in Tables 4 and 6.

Sample C10 is made of a combination of low Tg elastomers (natural rubber, cis-BR and emulsion-SBR) and low Tg mineral oil. It demonstrates a low temperature stiffness (E' at −40° C.) of around 33 MPa and tear resistance around 30 N/mm Sample E11 is made by replacing the low Tg mineral oil in Sample C10 by a low Tg high oleic sunflower oil where an undesirable and significant increase of low temperature stiffness from 33 to 61 MPa is observed. Sample E12 is made by replacing the low Tg mineral oil in Sample C10 by a low Tg medium oleic sunflower oil where the low temperature stiffness is also undesirably increased from around 33 MPa to around 41 MPa. Sample E13 is made by replacing the low Tg mineral oil in Sample C10 by a low Tg epoxidized mono-ester of high oleic sunflower oil where the low temperature stiffness is also undesirably increased from around 33 MPa to around 51 MPa. Sample E14 is made by replacing the low Tg mineral oil in Sample C10 by a very low Tg mono-ester of high oleic sunflower oil where the low temperature stiffness is desirably decreased from around 33 MPa to around 25 MPa. Simultaneously, the tear resistance of Sample E14 is around 31 N/mm and thus it is very similar to that of Sample C10 around 30 N/mm.

Sample C11 is made of a combination of low Tg elastomers (natural rubber and cis-BR) and a low Tg mineral oil. It demonstrates a low temperature stiffness (E' at −40° C.) of around 43 MPa and a tear resistance around 28 N/mm Sample E15 is made by replacing the low Tg mineral oil in Sample C11 by a low Tg high oleic sunflower oil where an undesirable and significant increase of low temperature stiffness from 43 to 120 MPa is observed. Sample E16 is made by replacing the low Tg mineral oil in Sample C11 by a low Tg epoxidized mono-ester of high oleic sunflower oil where the low temperature stiffness is also undesirably increased from around 43 MPa to around 93 MPa. Sample E17 is made by replacing the low Tg mineral oil in Sample C11 by a very low Tg mono-ester of high oleic sunflower oil where the low temperature stiffness is desirably decreased from around 43 MPa to around 39 MPa. Simultaneously, the tear resistance of Sample E17 is around 31 N/mm and thus it is slightly higher than that of Sample C11 around 28 N/mm.

Unexpectedly, it is seen from Samples E14 and E17 that by using low Tg mono-ester of high oleic sunflower oil in place of a low Tg mineral oil, the low temperature stiffness can be remarkably reduced while maintaining the tear resistance of a rubber compound made out of low Tg synthetic and natural elastomers.

TABLE 1

| Composition | C1 | C2 | C3 | C4 | C5 | C6 | C7 | C8 | C9 |
|---|---|---|---|---|---|---|---|---|---|
| Styrene-butadiene (A)[1] | 100 | 75 | 50 | 25 | 0 | 0 | 0 | 0 | 0 |
| Polybutadiene[2] | 0 | 25 | 50 | 75 | 100 | 75 | 50 | 25 | 0 |
| Natural rubber | 0 | 0 | 0 | 0 | 0 | 25 | 50 | 75 | 100 |
| Naphthenic oil[3] | 46 | 48 | 50 | 52 | 54 | 50 | 46 | 42 | 38 |
| Antioxidant(s) | 4.5 | 4.5 | 4.5 | 4.5 | 4.5 | 4.5 | 4.5 | 4.5 | 4.5 |
| Stearic acid | 3 | 3 | 3 | 3 | 3 | 3 | 3 | 3 | 3 |
| Silane[4] | 5.6 | 5.6 | 5.6 | 5.6 | 5.6 | 5.6 | 5.6 | 5.6 | 5.6 |
| Silica[5] | 90 | 90 | 90 | 90 | 90 | 90 | 90 | 90 | 90 |
| ZnO | 2.5 | 2.5 | 2.5 | 2.5 | 2.5 | 2.5 | 2.5 | 2.5 | 2.5 |
| Sulfur | 1.6 | 1.6 | 1.6 | 1.6 | 1.6 | 1.6 | 1.6 | 1.6 | 1.6 |
| Accelerator | 5.1 | 4.8 | 4.5 | 4.3 | 4.1 | 3.7 | 3.3 | 3 | 2.7 |

[1]Solution polymerized SBR with styrene content of 15% and 1,2-vinyl content of 30%, Tg = −60° C. obtained from Styron as SLR3402.
[2]High cis polybutadiene, obtained as Budene 1207 from The Goodyear Tire & Rubber Company.
[3]Naphthenic oil of Tg = −76° C.
[4]TESPD type silane coupling agent
[5]Hi-Sil 315G-D precipitated silica from PPG with a CTAB surface area of 125 m$^2$/g

TABLE 2

| | C1 | C2 | C3 | C4 | C5 | C6 | C7 | C8 | C9 |
|---|---|---|---|---|---|---|---|---|---|
| Composition | | | | | | | | | |
| Styrene-butadiene rubber (A) | 100 | 75 | 50 | 25 | 0 | 0 | 0 | 0 | 0 |
| Polybutadiene | 0 | 25 | 50 | 75 | 100 | 75 | 50 | 25 | 0 |
| Natural rubber | 0 | 0 | 0 | 0 | 0 | 25 | 50 | 75 | 100 |
| Naphthenic oil | 46 | 48 | 50 | 52 | 54 | 50 | 46 | 42 | 38 |
| Dynamic properties (100° C.)[1]. | | | | | | | | | |
| G' at 1% strain (MPa) | 1.39 | 1.33 | 1.27 | 1.3 | 1.37 | 1.48 | 1.63 | 1.68 | 1.73 |
| TanD at 10% strain | 0.08 | 0.08 | 0.09 | 0.1 | 0.11 | 0.13 | 0.14 | 0.15 | 0.16 |
| Hardness | | | | | | | | | |
| Shore A (23° C.) | 58 | 55 | 55 | 57 | 55 | 57 | 60 | 62 | 61 |
| Tensile properties[2] | | | | | | | | | |
| Modulus at 300% strain (MPa) | 9.5 | 8.3 | 7.4 | 6.4 | 5.6 | 5.9 | 6.4 | 6.9 | 7.4 |
| Tensile strength (MPa) | 9.5 | 11.1 | 11.6 | 11.4 | 11 | 9.3 | 14 | 14.8 | 14.5 |
| Elongation at break (%) | 429 | 399 | 449 | 489 | 530 | 466 | 617 | 605 | 554 |
| Low temperature properties[3] | | | | | | | | | |
| E' at 0.25% strain, −40° C. (MPa) | 21.8 | 16 | 16 | 16.8 | 48.4 | 48.7 | 45.5 | 41.5 | 52.5 |

TABLE 2-continued

|  | C1 | C2 | C3 | C4 | C5 | C6 | C7 | C8 | C9 |
|---|---|---|---|---|---|---|---|---|---|
| Tear resistance[4] | | | | | | | | | |
| Adhesion to itself (N/mm) | 11 | 13 | 15 | 19 | 25 | 26 | 28 | 32 | 39 |

[1] Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.
[2] Data according to Automated Testing System instrument by the Instron Corporation. Such instrument may determine ultimate tensile, ultimate elongation, modulii, etc.
[3] Low temperature dynamic properties were determined by means of a GABO Eplexor tester. The test specimen is subjected to 0.25% sinusoidal deformation at 1 Hz and the temperature is varied.
[4] ASTM D4393 except that a sample width of 2.5 cm is used and a clear Mylar 15 plastic film window of a 5 mm width is inserted between the two test samples. It is an interfacial adhesion measurement (pulling force expressed in N/mm units) between two layers of the same tested compound which have been co-cured together with the Mylar film window therebetween. The purpose of the Mylar film window is to delimit the width of the pealed area.

TABLE 3

| Composition | C10 | E11 | E12 | E13 | E14 |
|---|---|---|---|---|---|
| Styrene-butadiene rubber (B) [1] | 20.6 | 20.6 | 20.6 | 20.6 | 20.6 |
| Polybutadiene | 30 | 30 | 30 | 30 | 30 |
| Natural rubber | 55 | 55 | 55 | 55 | 55 |
| Naphthenic oil | 44 | 0 | 0 | 0 | 0 |
| Vegetable oil A (Tg = −85° C.) [2] | 0 | 44 | 0 | 0 | 0 |
| Vegetable oil B (Tg = −85° C.) [3] | 0 | 0 | 44 | 0 | 0 |
| Vegetable oil C (Tg = −90° C.) [4] | 0 | 0 | 0 | 44 | 0 |
| Vegetable oil D (Tg = −110° C.) [5] | 0 | 0 | 0 | 0 | 44 |
| Antioxidant(s) | 4.5 | 4.5 | 4.5 | 4.5 | 4.5 |
| Stearic acid | 3 | 3 | 3 | 3 | 3 |
| Silane [8] | 5.6 | 5.6 | 5.6 | 5.6 | 5.6 |
| Silica [9] | 90 | 90 | 90 | 90 | 90 |
| ZnO | 2.5 | 2.5 | 2.5 | 2.5 | 2.5 |
| Sulfur | 1.6 | 1.6 | 1.6 | 1.6 | 1.6 |
| Accelerator | 3.6 | 3.6 | 4.5 | 3.6 | 3.6 |

[1] Emulsion polymerized SBR with styrene contact of 23.5%, Tg = −53° C.
[2] high oleic sunflower oil obtained from Cargill as Agripure oil with oleic acid content around 84%, Tg = −85° C.
[3] medium oleic sunflower oil obtained from Cargill as Agripure oil with oleic acid content around 65%, Tg = −85° C.
[4] epoxidized mono ester of high oleic sunflower oil, Tg = −90° C., obtained as Pionier TP130C from HUR.
[5] mono ester of high oleic sunflower oil, Tg = −110° C., obtained as Pionier TP130B from HUR.

TABLE 4

| Composition | C10 | E11 | E12 | E13 | E14 |
|---|---|---|---|---|---|
| Styrene-butadiene rubber (B) | 20.6 | 20.6 | 20.6 | 20.6 | 20.6 |
| Polybutadiene | 30 | 30 | 30 | 30 | 30 |
| Natural rubber | 55 | 55 | 55 | 55 | 55 |
| Naphthenic oil | 44 | 0 | 0 | 0 | 0 |
| Vegetable oil A (Tg = −85° C.) | 0 | 44 | 0 | 0 | 0 |
| Vegetable oil B (Tg = −85° C.) | 0 | 0 | 44 | 0 | 0 |
| Vegetable oil C (Tg = −90° C.) | 0 | 0 | 0 | 44 | 0 |
| Vegetable oil D (Tg = −110° C.) | 0 | 0 | 0 | 0 | 44 |
| Dynamic properties (100° C.) | | | | | |
| G' at 1% strain (MPa) | 1.82 | 1.55 | 1.64 | 1.40 | 1.53 |
| TanD at 10% strain | 0.16 | 0.16 | 0.15 | 0.16 | 0.16 |
| Hardness | | | | | |
| Shore A (23° C.) | 56.2 | 55.3 | 54.5 | 48.4 | 51.3 |
| Tensile properties | | | | | |
| Modulus at 300% strain (MPa) | 6.7 | 6.3 | 6.7 | 4.6 | 5.9 |
| Tensile strength (MPa) | 18.5 | 18.6 | 18.9 | 16.8 | 18.4 |
| Elongation at break (%) | 642 | 681 | 671 | 733 | 701 |
| Low temperature properties | | | | | |
| E' 0.25% strain, −40° C. (MPa) | 33.1 | 67.5 | 40.6 | 51.3 | 25.4 |
| Tear resistance | | | | | |
| Strebler tear (N/mm) | 30 | 34 | 30 | 47 | 31 |

TABLE 5

| Composition | C11 | E15 | E16 | E17 |
|---|---|---|---|---|
| Polybutadiene | 50 | 50 | 50 | 50 |
| Natural rubber | 50 | 50 | 50 | 50 |
| Naphthenic oil | 44 | 0 | 0 | 0 |
| Vegetable oil (A) | 0 | 44 | 0 | 0 |
| Vegetable oil (C) | 0 | 0 | 44 | 0 |
| Vegetable oil (D) | 0 | 0 | 0 | 44 |
| Antioxidant(s) | 4.5 | 4.5 | 4.5 | 4.5 |
| Stearic acid | 3 | 3 | 3 | 3 |
| Silane [8] | 5.6 | 5.6 | 5.6 | 5.6 |
| Silica [9] | 90 | 90 | 90 | 90 |
| ZnO | 2.5 | 2.5 | 2.5 | 2.5 |
| Sulfur | 1.6 | 1.6 | 1.6 | 1.6 |
| Accelerator | 3.6 | 4.2 | 4.4 | 4.0 |

TABLE 6

| Composition | C11 | E15 | E16 | E17 |
|---|---|---|---|---|
| Polybutadiene | 50 | 50 | 50 | 50 |
| Natural rubber | 50 | 50 | 50 | 50 |

TABLE 6-continued

| Composition | C11 | E15 | E16 | E17 |
|---|---|---|---|---|
| Naphthenic oil | 44 | 0 | 0 | 0 |
| Vegetable oil A (Tg = −85° C.) | 0 | 44 | 0 | 0 |
| Vegetable oil C (Tg = −90° C.) | 0 | 0 | 44 | 0 |
| Vegetable oil D (Tg = −110° C.) | 0 | 0 | 0 | 44 |
| Dynamic properties (100° C.) | | | | |
| G' at 1% strain (MPa) | 2.12 | 1.99 | 1.55 | 1.98 |
| TanD at 10% strain | 0.17 | 0.17 | 0.16 | 0.17 |
| Hardness | | | | |
| Shore A (23° C.) | 57 | 56 | 51 | 55 |
| Tensile properties | | | | |
| Modulus at 300% strain (MPa) | 6.6 | 6.3 | 4.8 | 5.8 |
| Tensile strength (MPa) | 17.4 | 18.6 | 17.5 | 17.0 |
| Elongation at break (%) | 628 | 701 | 751 | 678 |
| Low temperature properties | | | | |
| E' 0.25% strain, −40° C. (MPa) | 43.0 | 119.9 | 93.3 | 39.6 |
| Tear resistance | | | | |
| Strebler tear (N/mm) | 28 | 34 | 40 | 31 |

[1] Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.
[2] Measured at 2% strain, frequency 0.33/3.33 Hz, 100 C. Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.
[3] The G' modulus and tanD at low temperatures can be readily determined by a Metravib TM instrument at 1.5 percent strain and 7.8 Hertz. The test method is understood to be similar to ISO 4664 and DIN 53513.
[4] Rebound is a measure of hysteresis of the compound when subject to loading, as measured by ASTM D1054. Generally, the lower the measured rebound at 100° C., the lower the rolling resistance.
[5] Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

While certain representative embodiments and details have been shown for the purpose of illustrating the subject invention, it will be apparent to those skilled in this art that various changes and modifications can be made therein without departing from the scope of the subject invention.

The invention claimed is:

1. A pneumatic tire having a tread comprising a vulcanizable rubber composition comprising, based on 100 parts by weight of elastomer (phr),
   100 phr of a diene based elastomer having a glass transition temperature less than −50° C., wherein the diene based elastomer is selected form the group consisting of natural rubber, polybutadiene, synthetic polyisoprene, solution polymerized styrene-butadiene rubber with bound styrene content ranging from 9 to 15 percent by weight, and emulsion polymerized styrene-butadiene rubber with bound styrene content ranging from 5 to 23.5 percent by weight;
   from 40 to 55 phr of a fatty acid monoester of formula 1

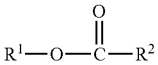

where $R^1$ is selected from C1 to C8 linear or branched alkyl, and C1 to C8 linear or branched alkenyl; $R^2$ is C11 to C21 alkyl or C11 to C21 alkenyl;
   less than 10 phr of a processing oil;
   from 50 to 130 phr of silica; and
   optionally, from about 5 to 50 phr carbon black.

2. The pneumatic tire of claim 1, wherein $R^1$ is selected from the group consisting of methyl, ethyl, 2-ethylhexyl, isopropyl, and octyl.

3. The pneumatic tire of claim 1, wherein $R^1$ is C1 to C8 linear or branched alkyl.

4. The pneumatic tire of claim 1, wherein the fatty acid monoester comprises at least one monoester selected from the group consisting of alkyl oleates, alkyl stearates, alkyl linoleates, and alkyl palmitates.

5. The pneumatic tire of claim 1, wherein the fatty acid monoester comprises at least 80 percent by weight of an alkyl oleate.

6. The pneumatic tire of claim 5, wherein the alkyl oleate is selected from the group consisting of methyl oleate, ethyl oleate, 2-ethylhexyl oleate, isopropyl oleate, and octyl oleate.

* * * * *